United States Patent [19]
Remer et al.

[11] Patent Number: 5,559,631
[45] Date of Patent: Sep. 24, 1996

[54] METHOD AND APPARATUS FOR CONTROLLING THE BRIGHTNESS AND/OR COLOR TEMPERATURE OF A MICROSCOPE ILLUMINATION SYSTEM

[75] Inventors: Lucius Remer, Moerfelden-Walldorf; Joerg Schoenenborn, Wetzlar; Manfred Gilbert, Solms, all of Germany

[73] Assignee: Leica Mikroskopie und Systeme GmbH, Wetzlar, Germany

[21] Appl. No.: 94,045

[22] PCT Filed: Dec. 23, 1992

[86] PCT No.: PCT/DE92/01085

§ 371 Date: Aug. 4, 1993

§ 102(e) Date: Aug. 4, 1993

[87] PCT Pub. No.: WO93/13444

PCT Pub. Date: Jul. 8, 1993

[30] Foreign Application Priority Data

Dec. 24, 1991 [DE] Germany ............... 41 42 925.7

[51] Int. Cl.⁶ .................................................. G02B 21/06
[52] U.S. Cl. .................................................. 359/385
[58] Field of Search ................................. 359/385–389; 362/231, 236

[56] References Cited

U.S. PATENT DOCUMENTS

| | | | |
|---|---|---|---|
| 4,233,650 | 11/1980 | Hagner et al. | 362/32 |
| 4,361,863 | 11/1982 | Hagner | 362/32 |
| 4,641,227 | 2/1987 | Kusuhara | 362/231 |
| 4,714,823 | 12/1987 | Spruck et al. | 250/205 |
| 5,022,744 | 6/1991 | Leiter | 359/385 |

FOREIGN PATENT DOCUMENTS

| | | |
|---|---|---|
| 2528988 | 12/1983 | France . |
| 2701764 | 7/1978 | Germany . |
| 2745397 | 4/1979 | Germany . |
| 2757543 | 6/1979 | Germany . |
| 3535749 | 10/1986 | Germany . |
| 3606755 | 11/1986 | Germany . |
| 8802996 | 7/1988 | Germany . |
| 2122385 | 1/1984 | United Kingdom . |

OTHER PUBLICATIONS

Patent Abstracts of Japan, vol. 7, No. 210, Sep., 1983 (P–233) (1355), JP 58–105208.

*Primary Examiner*—K. Hantis
*Attorney, Agent, or Firm*—Foley & Lardner

[57] ABSTRACT

Methods are described for the control of the brightness in a manner independent of color and for the control of the color temperature in a manner independent of brightness, of the illumination light for a microscope device. An apparatus for carrying out the methods includes, beside a main light source 4, a secondary light source 5 with a color filter 6. Both light sources are electrically connected to a common regulating apparatus 8. By means of stored current values and by means of controllers 9, 10 and/or 19 which are to be operated manually, the light sources 4, 5 are driven using appropriate current values.

28 Claims, 2 Drawing Sheets

METHOD AND APPARATUS FOR CONTROLLING THE BRIGHTNESS AND/OR COLOR TEMPERATURE OF A MICROSCOPE ILLUMINATION SYSTEM

BACKGROUND OF THE INVENTION

The invention relates to a method for controlling the brightness in a manner independent of color and/or for controlling the color temperature in a manner independent of brightness for a microscope illumination system, as well as to an apparatus for carrying out the method.

In illumination apparatuses which exhibit an incandescent lamp, it is known for the brightness of the light emitted by a light source to be controlled by the lamp voltage being altered by means of an electrical circuit. However, control of the lamp voltage involves the disadvantage that the color temperature of the illumination light is altered at the same time thereby. A photographic exposure is possible under these light conditions only if chromatic defects in the subsequent photographic image are tolerated.

German Patent Publications DE-OS 2,757,543 and DE-UM 8,802,996 disclose apparatuses which preclude these defects. Both apparatuses exhibit a light source, a condenser system and an annular light guide. To control the illumination intensity, in DE-OS 2,757,543 a diaphragm slide is provided, which can be partially inserted into the illumination beam path between the individual condensers and thus covers a part of the beam. In DE-UM 8,802,996, to control the illumination intensity an opaque and displaceably arranged carrier with various perforated rasters is provided in front of the light entrance surface of the light guide. Since the light guide is designed to be homogeneous in its interior, the light exit surface of the light guide exhibits a uniform light intensity distribution. With such illumination apparatuses, control of the illumination intensity without alteration of the color temperature of the light is possible. However, it is disadvantageous that, besides a considerable expenditure on precision mechanisms, the total illumination intensity is also reduced by the light guide.

German Patent Publication DE-OS 2,745,397 discloses a light controller for light guide lamps with a multiplicity of individual fibers. To this end, a diaphragm made from a plurality of circular-sector surfaces is disposed in the illumination beam path between the lamp and the light entrance surface of the light guide.

To control the illumination intensity, these circular-sector surfaces are displaced with a handle relative to one another in such a manner that the illumination beam is cut asymmetrically in a disadvantageous manner. Furthermore, the region of high attenuation factors may be set only imprecisely.

German patent Publication DE-OS 2,701,764 discloses a light flux controller for controlling the brightness of illumination apparatuses for microscopes. This controller exhibits a carrier and a stationary family, disposed in the direction of the light, of light-transmitting channels. The carrier is disposed to be pivotable in the illumination beam path by means of a swivel apparatus. However, this apparatus is of very large dimensions and requires, as a result of the swivel apparatus, additional space in the illumination beam path of the microscope.

SUMMARY OF THE INVENTION

Accordingly, the object of the invention is to provide a method and an apparatus for a controllable illumination device for a microscope illumination system, in which the efficiency of the observation light which is usable for observation is optimized and, in addition, the possibility for controlling the brightness in a manner independent of color over a large control range and/or the possibility for controlling the color temperature of the illumination light in a manner independent of brightness are intended to be provided in a user-friendly manner.

In an apparatus for carrying out the methods according to the invention, beside the main light source there is provided a secondary light source with a color filter and a regulating device to control the two lamp currents, the regulating device setting the respective current for the two lamps at the same time by means of the controller so that:

a) in the case of controlling the brightness in a manner independent of color, the brightness of the main light source is controlled by means of the lamp current and at the same time the altered color temperature of the illumination light is compensated for by controlling the lamp current of the secondary light source provided with the color filter, b) in the case of controlling the color temperature in a manner independent of brightness the color temperature of the illumination light is controlled by controlling the lamp current of the secondary light source provided with the color filter and, at the same time, the altered brightness of the illumination light is compensated for by controlling the lamp current of the main light source.

An apparatus for the combined carrying out of both of these methods includes, beside the main light source, a secondary light source with the color filter and a regulating apparatus to control the two lamp currents, the regulating apparatus setting both lamp currents at the same time by means of two controllers operating separately from one another so that, in the case of controlling the brightness in a manner independent of color, the brightness of the main light source is controlled by means of the lamp current and at the same time the altered color temperature of the illumination light is compensated for by controlling the lamp current of the secondary light source, and, in the case of controlling the color temperature in a manner independent of brightness the color temperature of the illumination light is controlled by controlling the lamp current of the secondary light source and, at the same time, the altered brightness of the illumination light is compensated for by controlling the lamp current of the main light source.

Emphasis must be placed on the advantage that, with the use of a single commercially available conversion filter, the emission spectrum independent of color (Planck spectrum) is approximated to a good approximation over the entire control range. Thus, a defined color temperature is given for each point within the control range.

The invention is also distinguished by the fact that the thermal stressing of the microscope device is reduced, in that the proportion of the illumination light which can be used for observation is optimized.

BRIEF DESCRIPTION OF THE DRAWINGS

The methods according to the invention are diagrammatically shown in the drawings in conjunction with an apparatus which is suitable therefor.

In the drawings.

DETAILED DESCRIPTION OF THE PREFERRED EMBODIMENTS

Figure 1:
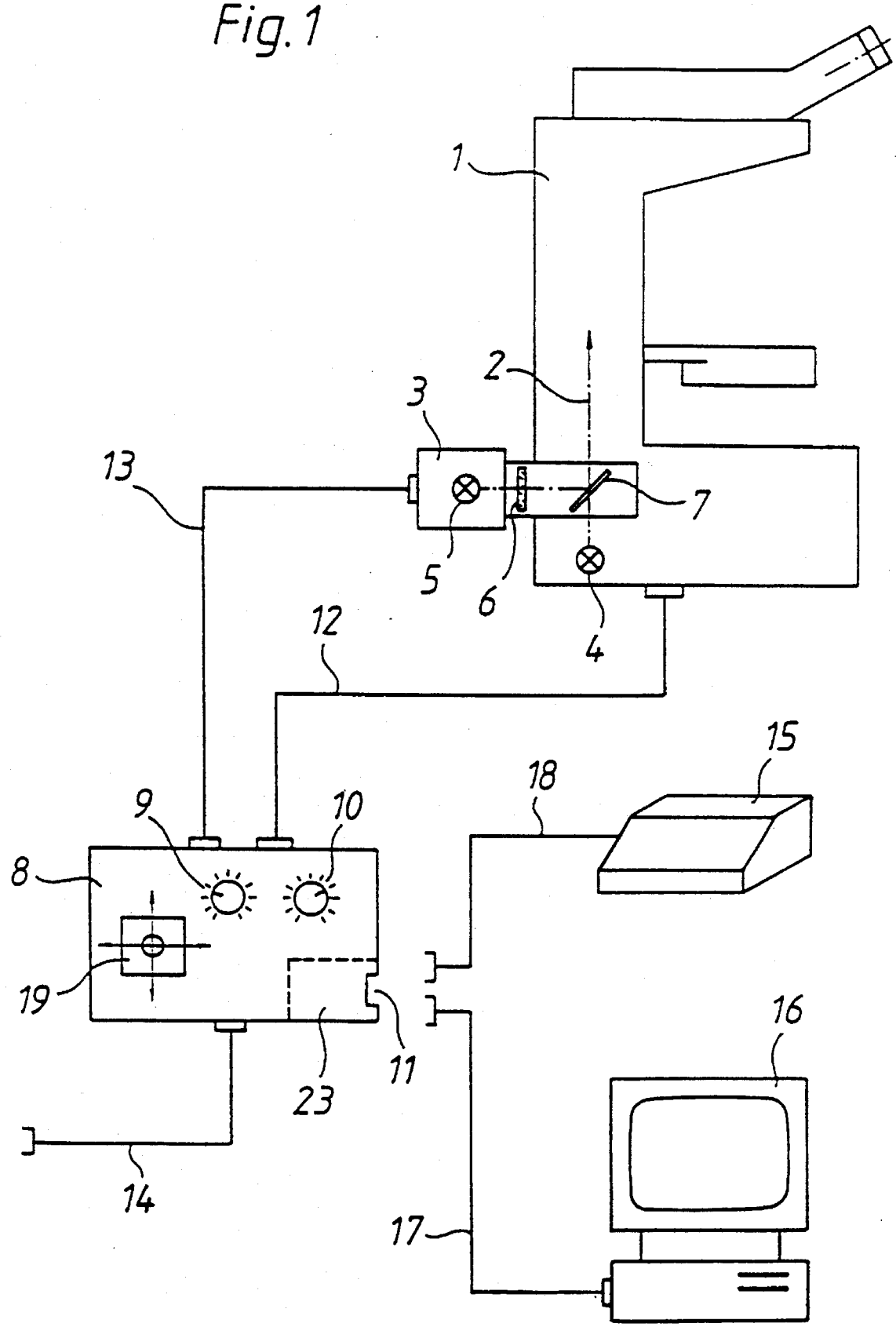
FIG. 1 shows a microscope stand with a main light source and a fitted lamp housing with a secondary light source.

FIG. 1 shows a microscope stand 1, an illumination beam path 2 with a main light source 4, an externally fittable lamp housing 3 with a secondary light source 5, a stationary conversion filter 6 and a partially transmitting deflecting mirror 7. Both the main light source 4 and the secondary light source 5 are provided with an external electrical supply. To this end, the power leads 12 and 13 respectively are connected to a regulating apparatus 8. This regulating apparatus has two current-stabilized power supply units (not separately shown), a controller 9 to set the color temperature, a controller 10 to set the brightness of the illumination light and an interface 11 (RS 232) for the connection of higher-level regulating devices 15, 16. The two controllers 9 and 10 are preferably designed as so-called multistage switches. The power supply to the regulating apparatus 8 with the stabilized power supply units is provided via the lead 14. In this regulating apparatus 8 there is provided a storage unit 23, in which prescribed current values or corresponding pairs of current values are stored for driving the two light sources 4 and 5 in accordance with the controller settings 9 and 10 respectively.

This drawing further shows a dual-axis switch lever (joystick) 19, which can take over the function of the two separate rotary controllers 9 and 10. The two rotary controllers 9 and 10 can be replaced by the joystick 19.

The regulating apparatus 8 is designed so that external regulating devices, in this case a photographic regulating apparatus 15 with a data bus 18 and a computer 16 with a data bus 17, can be connected to the regulating apparatus 8 via the interface 11. Via this interface 11, control commands are passed to the apparatus 8 and vice versa, in order for example to simulate the controller setting 9, 10.

Figure 2:
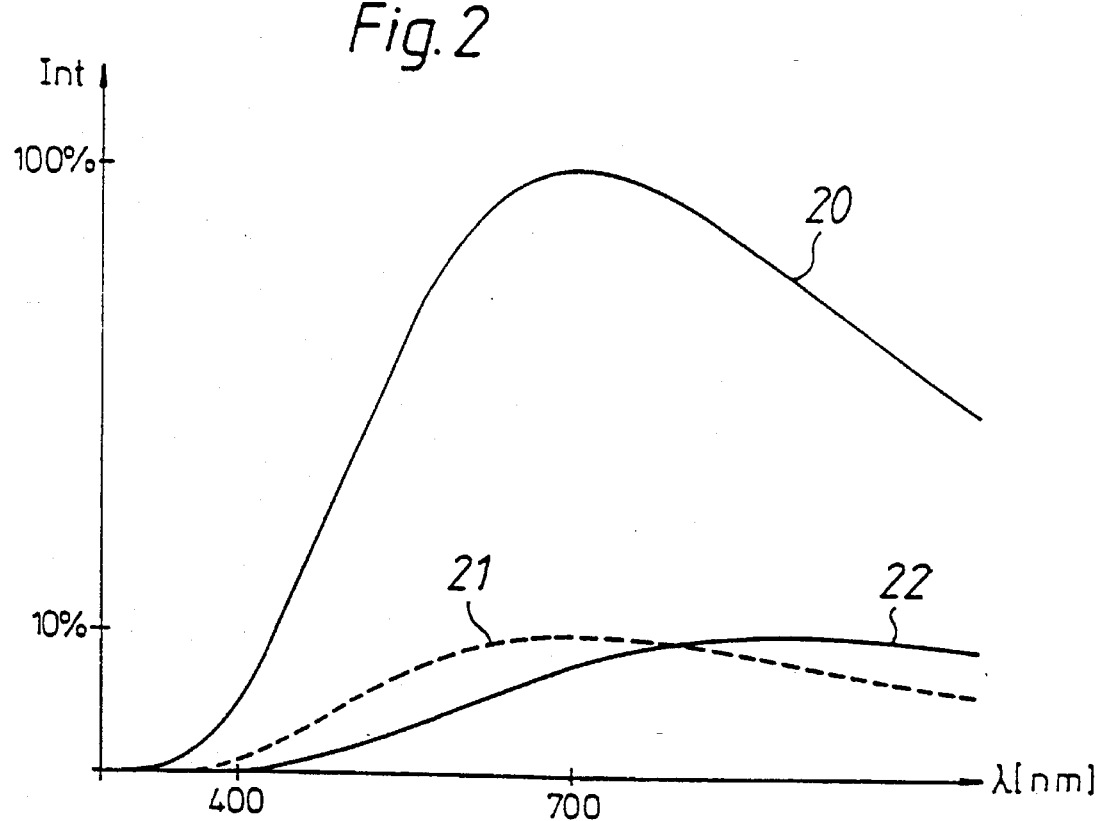
FIG. 2 shows a graphical representation of the Planck spectrum at various intensities

FIG. 2 shows Planck curves 20, 21 and 22 of the emission spectra of a halogen incandescent lamp for various operating currents. The curve 20 identifies the halogen lamp with a rated operating current corresponding to a color temperature of 3200K. In contrast to this maximum intensity, the emission spectrum of the same halogen incandescent lamp at approximately 10% intensity is characterized by the Planck curve 22 at 2400K. From the comparison of these two curves 20, 22, it becomes clear that, in the case of decreasing intensities or in the case of a reduced operating current, spectral emission of the lamp in the blue band decreases to a disproportionately great extent.

The curve 21 shows a Planck function for an illumination light at 13200K at approximately 10% intensity. From the comparison of the curves 21 and 22 it becomes clear that this combination of color temperature and intensity cannot be achieved by current/voltage alteration of a single halogen lamp, but instead an additional component of blue light must be admixed. This missing color component is compensated for, according to the invention, by the secondary light source 5 with the conversion filter 6.

Figure 3:
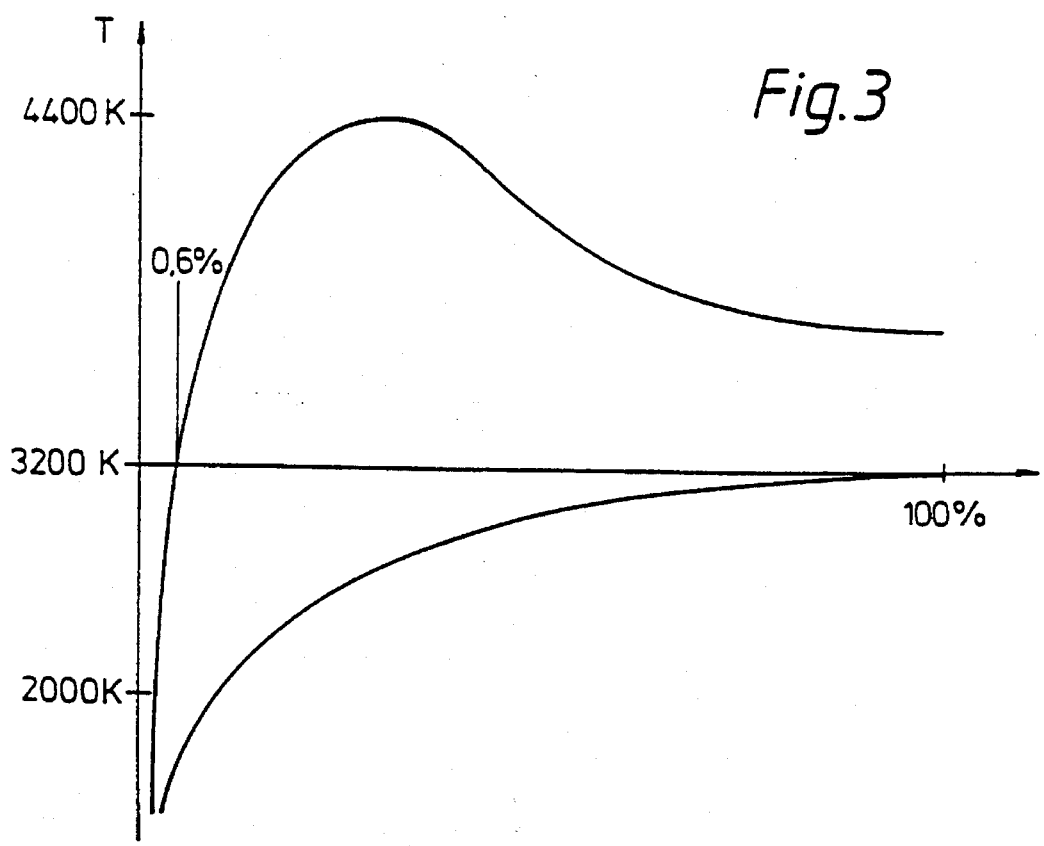
FIG. 3 shows a graphical representation of the control range of the illumination apparatus.

FIG. 3 shows a graph of the control range of the illumination system according to the invention with halogen lamps as they are customarily used in microscope illuminations. At a color temperature of 3200K, the total intensity of the system is fully controllable from 100% to approximately 0.6% relative intensity of the illumination system. Color temperatures deviating therefrom can be set with the illumination arrangement within the limits of the control range shown, for any selectable intensities. The control range shown here is associated with a specified lamp/filter/divider mirror combination. The alteration of one of these parameters, e.g., by the use of an orange conversion filter or dichromatic divider mirror, gives a different control range.

The mode of operation of the invention is explained in greater detail with reference to the illustrative embodiment of FIG. 1.

The main light source 4 integrated in the microscope stand 1 is electrically connected via the power supply lead 12 to the regulating apparatus 8. The secondary light source 5 is disposed in the separate housing 3, which is designed as a module and which exhibits blue conversion filters 6 and the divider mirror 7. The entire module 3 is designed to be capable of being coupled to the microscope stand 1. In this case, the divider mirror 7 is disposed in the illumination beam path 2. The power supply for the secondary light source 5 is provided via the electrical lead 13 with the regulating apparatus 8. Via the controllers 9 and 10 provided or the regulating apparatus 8, the brightness and the color temperature of the illumination light can be selected. The joystick 19, which is also shown in this drawing, can in this case take over the functions of the two individual controllers 9 and 10.

The brightness of the illumination light is controlled, starting from 100% of the intensity of the main light source 4 which is transmitted by the beam splitter 7, in that, as a function of the controller setting 10, the pertinent current values stored in the memory unit 23 are fed to the regulating apparatus 8 and the two light sources 4, 5 are driven correspondingly via the pertinent power supply units. This leads to a situation in which the brightness of the main light source 4 is reduced and at the same time, to compensate for the now missing blue light component, the secondary light source 5 is energized. Via the divider mirror 7, the light of the secondary light source 5 is reflected into the illumination beam path 2. The control range of the described illustrative embodiment is shown in FIG. 3. Starting from 100% total intensity (e.g. 100% intensity of the main light source 4 and 0% intensity of the secondary light source 5), the illumination light may be controlled at 3200K to approximately 0.6% total intensity in a manner independent of color. This control in a manner independent of color corresponds to a movement from right to left parallel to the abscissa in FIG. 3.

In a similar manner to this described control of the brightness in a manner independent of color, the control of the color temperature in a manner independent of brightness takes place using the same construction according to FIG. 1. This control then corresponds to a movement parallel to the ordinate in FIG. 3. The possibilities for setting the desired color temperature are possible in the illustrative embodiment with a blue conversion filter 6, within the range T shown in FIG. 3. In this case also, the setting takes place via an alteration of the lamp current of the main and secondary light source. In the control panel 8, there is provided a separate controller 9 for this purpose. By means of the controller setting and stored current values or pairs of current values, the two light sources 4 and 5 are driven.

The described controls of the microscope illumination light may of course also be set at the same time, within the ranges shown in FIG. 3. Other ranges of selection for setting are possible by the use of other filters, dividers or alternatively other types of light sources.

List of reference symbols

1 - Microscope stand
2 - Illumination beam path
3 - Fittable lamp housing
4 - Main light source
5 - Secondary light source
6 - Filter (conversion filter)
7 - Divider mirror
8 - Regulating apparatus
9 - Controller (color temperature)
10 - Controller (brightness)
11 - Interface (RS 232)
12 - Lead for power supply to the main light source 4
13 - Lead for power supply to the secondary light source 5
14 - Voltage supply line
15 - Photographic regulating device
16 - Computer
17 - Data bus, computer 16/interface 11
18 - Data bus, photographic regulating device 15/interface 11
19 - Dual-axis switch lever (joystick)
20 - Planck curve 3200K/100% intensity
21 - Planck curve 3200K/10% intensity
22 - Planck curve 2400K
23 - Memory unit

We claim:

1. A microscope illumination system, comprising:

a microscope housing containing an illumination beam;

a fixed main light source whose brightness and color temperature vary in accordance with a first current provided to said main light source;

a fixed secondary light source whose brightness and color temperature vary in accordance with a second current provided to said secondary light source;

optics to combine light from said main light source and from said secondary light source to produce said illumination beam; and a regulating circuit to vary said first current and said second current such that (1) a brightness of said illumination beam is varied while maintaining a color temperature of said illumination beam constant and (2) a color temperature of said illumination beam is varied while maintaining a brightness of said illumination beam constant.

2. A microscope illumination system as set forth in claim 1, further comprising a filter to filter light from said secondary light source before light from said secondary light source becomes part of said illumination beam.

3. A microscope illumination system as set forth in claim 1, wherein:

said main light source determines said brightness of said illumination beam and said secondary light source compensates for color temperature variation of said main light source; and said secondary light source determines said color temperature of said illumination beam and said main light source compensates for brightness variation of said secondary light source.

4. A microscope illumination system as set forth in claim 1, wherein said regulating circuit includes a joystick to set the brightness and color temperature of said illumination beam.

5. A microscope illumination system as set forth in claim 1, wherein said regulating circuit includes an interface to receive brightness and color temperature information from a photographic regulating device.

6. A microscope illumination system as set forth in claim 1, wherein said regulating circuit includes an interface to receive brightness and color temperature information from a computer.

7. A microscope illumination system as set forth in claim 1, further comprising a divider mirror to combine light from said main light source and from said secondary light source.

8. A microscope illumination system as set forth in claim 1, wherein said regulating circuit comprises a memory to store pairs of first and second current values.

9. A microscope illumination system as set forth in claim 1, further comprising a separate housing, connected to said microscope housing, to contain said secondary light source.

10. A microscope illumination system as set forth in claim 1, wherein said main and secondary light sources are halogen lamps.

11. A microscope illumination system, comprising:

a microscope housing containing an illumination beam;

a fixed main light source whose brightness and color temperature vary in accordance with a first current provided to said main light source;

a fixed secondary light source whose brightness and color temperature vary in accordance with a second current provided to said secondary light source;

optics to combine light from said main light source and from said secondary light source to produce said illumination beam; and a regulating circuit to vary said first current and said second current such that a brightness of said illumination beam is varied while maintaining a color temperature of said illumination beam constant.

12. A microscope illumination system as set forth in claim 11, further comprising a filter to filter light from said secondary light source before light from said secondary light source becomes part of said illumination beam.

13. A microscope illumination system as set forth in claim 11, wherein said regulating circuit includes an interface to receive brightness and color temperature information from a photographic regulating device.

14. A microscope illumination system as set forth in claim 11, wherein said regulating circuit includes an interface to receive brightness and color temperature information from a computer.

15. A microscope illumination system as set forth in claim 11, further comprising a divider mirror to combine light from said main light source and from said secondary light source.

16. A microscope illumination system as set forth in claim 11, wherein:

said main light source determines said brightness of said illumination beam and said secondary light source compensates for color temperature variation of said main light source.

17. A microscope illumination system as set forth in claim 11, wherein said main and secondary light sources are halogen lamps.

18. A microscope illumination system as set forth in claim 11, wherein said regulating circuit comprises a memory to store pairs of first and second current values.

19. A microscope illumination system, comprising:

a microscope housing containing an illumination beam;

a fixed main light source whose brightness and color temperature vary in accordance with a first current provided to said main light source;

a fixed secondary light source whose brightness and color temperature vary in accordance with a second current provided to said secondary light source;

optics to combine light from said main light source and from said secondary light source to produce said illumination beam; and a regulating circuit to vary said first current and said second current such that a color temperature of said illumination beam is varied while maintaining a brightness of said illumination beam constant.

20. A microscope illumination system as set forth in claim 19, further comprising a filter to filter light from said secondary light source before light from said secondary light source becomes part of said illumination beam.

21. A microscope illumination system as set forth in claim 19, wherein said regulating circuit includes an interface to receive brightness and color temperature information from a photographic regulating device.

22. A microscope illumination system as set forth in claim 19, wherein said regulating circuit includes an interface to receive brightness and color temperature information from a computer.

23. A microscope illumination system as set forth in claim 19, further comprising a divider mirror to combine light from said main light source and from said secondary light source.

24. A microscope illumination system as set forth in claim 19, wherein:

said secondary light source determines said color temperature of said illumination beam and said main light source compensates for brightness variation of said second light source.

25. A microscope illumination system as set forth in claim 19, wherein said main and secondary light sources are halogen lamps.

26. A microscope illumination system as set forth in claim 19, wherein said regulating circuit comprises a memory to store pairs of first and second current values.

27. A method of controlling an illumination beam for a microscope, comprising the steps of:

(a) adjusting a first current to a first fixed light source to set a brightness of said illumination beam, said adjusting of said first current causing a color temperature of said first light source to vary;

(b) compensating for color temperature variation of said first light source by adjusting a second current to a second fixed light source; and (c) combining light from said first light source and from said second light source to produce said illumination beam.

28. A method of controlling an illumination beam for a microscope, comprising the steps of:

(a) adjusting a first current to a first fixed light source to set a color temperature of said illumination beam, said adjusting of said first current causing a brightness of said first light source to vary;

(b) compensating for brightness variation of said first light source by adjusting a second current to a second fixed light source; and (c) combining light from said first light source and from said second light source to produce said illumination beam.

* * * * *